Nov. 7, 1944.  H. C. FRENCH  2,361,935
STEERING MECHANISM FOR TWO-WHEELED TRACTORS OR THE LIKE
Filed Dec. 26, 1942    3 Sheets-Sheet 1
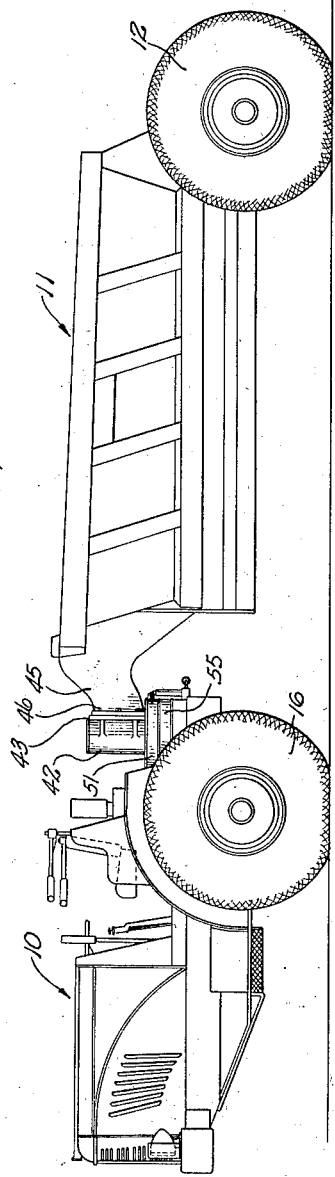
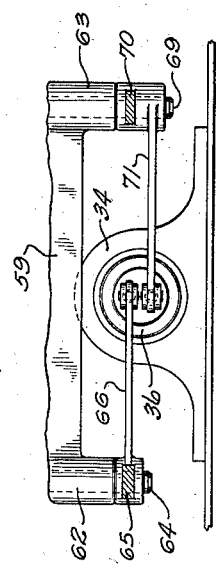
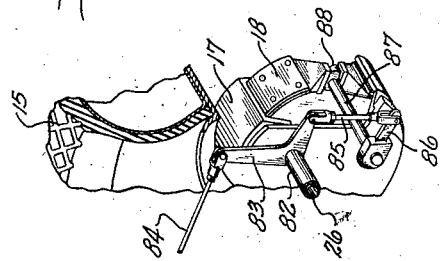
INVENTOR.
Henry C. French
BY Morsell & Morsell
ATTORNEYS.

Nov. 7, 1944.   H. C. FRENCH   2,361,935
STEERING MECHANISM FOR TWO-WHEELED TRACTORS OR THE LIKE
Filed Dec. 26, 1942   3 Sheets-Sheet 2

INVENTOR.
Henry C. French
BY Morsell & Morsell
ATTORNEYS.

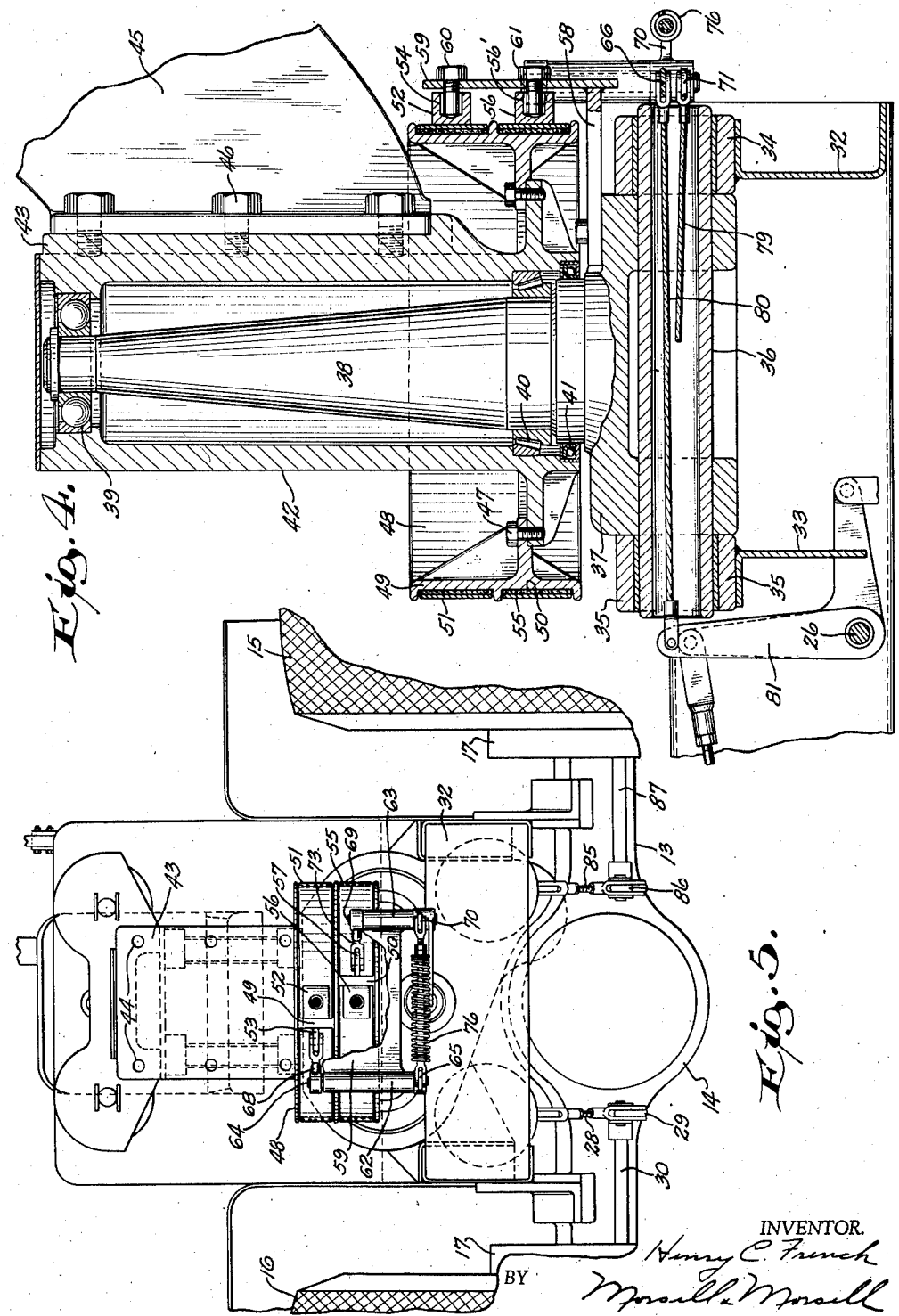

Patented Nov. 7, 1944

2,361,935

UNITED STATES PATENT OFFICE 2,361,935

STEERING MECHANISM FOR TWO-WHEELED TRACTORS OR THE LIKE

Henry C. French, Elm Grove, Wis., assignor to The Heil Co., Milwaukee, Wis., a corporation of Wisconsin Application December 26, 1942, Serial No. 470,259

11 Claims. (Cl. 280—33.1)

This invention relates to improvements in Steering mechanism for two-wheeled tractors or the like.

When two-wheeled tractors are employed for the purpose of pulling two-wheeled scrapers, two-wheeled dump wagons, or similar trailer units, the rear vehicle has a fifth wheel connection with the tractor, and steering must be accomplished by causing a relative turning movement of the tractor while the fifth wheel serves as a pivot point. Heretofore, considerable difficulty has been encountered in providing a simple, quick acting, and sensitive steering method which will be effective under all of the varying ground conditions encountered in use. In pulling a trailer or scraper unit the tractor wheels on opposite sides may contact dirt or other material of quite different consistency, with the result that the wheel having the greater traction does the driving while the other wheel side slips. Thus the pulling tractor might dodge or swing from side to side relative to the trailer unit in a manner which is entirely out of the control of the operator.

It is a general object of the present invention to obviate the above mentioned difficulties by providing improved steering mechanism wherein the relative swinging movement around the fifth wheel in either direction is normally prevented and wherein novel means is utilized for causing steering movement of the tractor and for allowing relative pivotal movement at the fifth wheel in the direction which has been selected.

A more specific object of the invention is to provide in a device of the class described combination braking mechanism for applying braking pressure to a selected one of the tractor wheels and for releasing a brake at the fifth wheel to permit relative pivotal movement between the tractor and the trailer vehicle.

A further more specific object of the invention is to provide a construction as above described including a vertical pivot column or equivalent member rigidly connectible to the trailer vehicle and an intermediate element on the tractor having a king pin, wherein a brake drum is connected to said vertical pivot column and wherein a brake band is anchored to the intermediate element, said band being cooperable with said drum to control the pivotal movement around the king pin.

A further specific object of the invention is to provide in a device as above specified having two brake drums on the vertical pivot column and having two brake bands wound in reverse directions from each other around said drums, means for normally urging both of said bands into light braking engagement so that any tendency of one of the vehicles to swing in either direction with respect to the other vehicle will serve to cause automatic wrapping of one or the other of said bands tightly about its drum to restrain said swinging tendency, and means for selectively releasing one or the other of said brake bands when it is desired to steer in a selected direction.

A further object of this invention is to provide mechanism as above described wherein the intermediate or king pin carrying element is mounted on a longitudinal horizontally positioned pivot sleeve on the tractor, and wherein brake band operating cables are extended through said pivot sleeve so that the brake bands can be controlled regardless of the angular position of the tractor.

A further object of the invention is to provide steering mechanism for two wheeled tractors or the like wherein the quickness of the turn may be controlled according to the amount of pull on the steering lever.

With the above and other objects in view, the invention consists of the improved steering mechanism for two-wheeled tractors or the like, and all its parts and combinations as set forth in the claims, and all equivalents thereof. In the accompanying drawings illustrating one complete embodiment of the preferred form of the invention, in which the same reference numerals designate the same parts in all of the views, Fig. 1 is a side elevational view showing a tractor pulling a two-wheeled trailer wagon, the tractor being equipped with the improved steering mechanism;

Fig. 4 is a longitudinal vertical section through the fifth wheel taken approximately on the line 4—4 of Fig. 3, parts being broken away;

Fig. 5 is a rear elevational view of the tractor, parts being broken away;

Fig. 6 is a fragmentary perspective view illustrating the brake in connection with the right wheel of the tractor and associated mechanism; and Fig. 7 is a fragmentary sectional view taken on the line 7—7 of Fig. 3.

Figure 3:
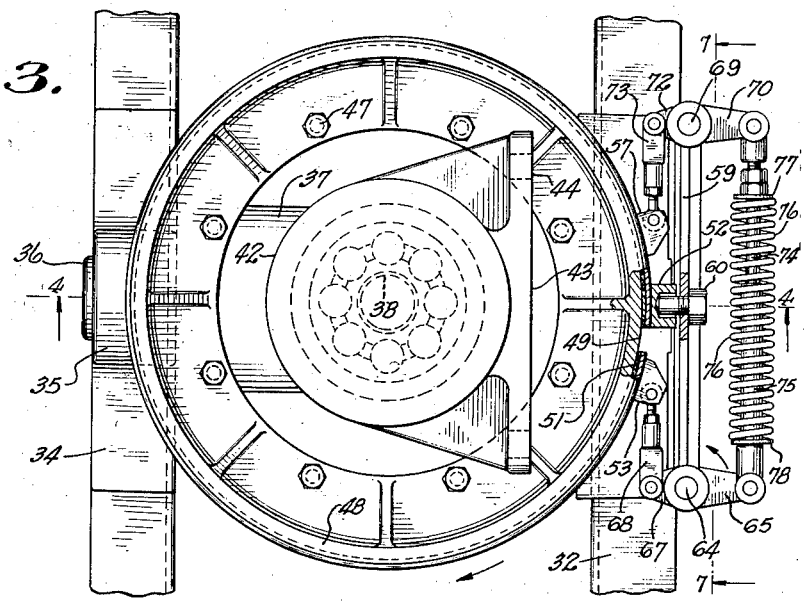
Fig. 3 is a fragmentary plan view on an enlarged scale illustrating the top of the fifth wheel and associated mechanism.

Referring more particularly to the drawings, the improved tractor is designated generally by the numeral 10 and is adapted to pull a trailer vehicle 11 having a single pair of rear wheels 12. In Fig. 1 of the drawings a trailer dump wagon is illustrated, but the tractor is adapted for use in connection with two-wheeled scrapers or any other two-wheeled trailer vehicles.

Referring to Fig. 5, the tractor has a single axle assembly 13 including a standard differential 14 having differential gears driven by the usual transmission from the tractor engine. On one end of the axle is a wheel 15, and on the other end a wheel 16. The wheel and axle assembly, including the differential 14, is identical to that employed in the rear axle of the common type of four-wheel automotive vehicle, wherein when making a turn the differential gearing permits one of the driven wheels to rotate more slowly or even not at all, while the other wheel does the driving as the turn is being effected.

Each of the wheels is equipped with the usual brake drum 17 and internal expanding brake band 18. These brakes are under the control of the tractor brake pedal and may be hydraulically operated in the usual manner to stop the tractor. The same brakes, however, are also utilized in conjunction with the improved tractor steering mechanism, as will be hereinafter described.

Figure 2:
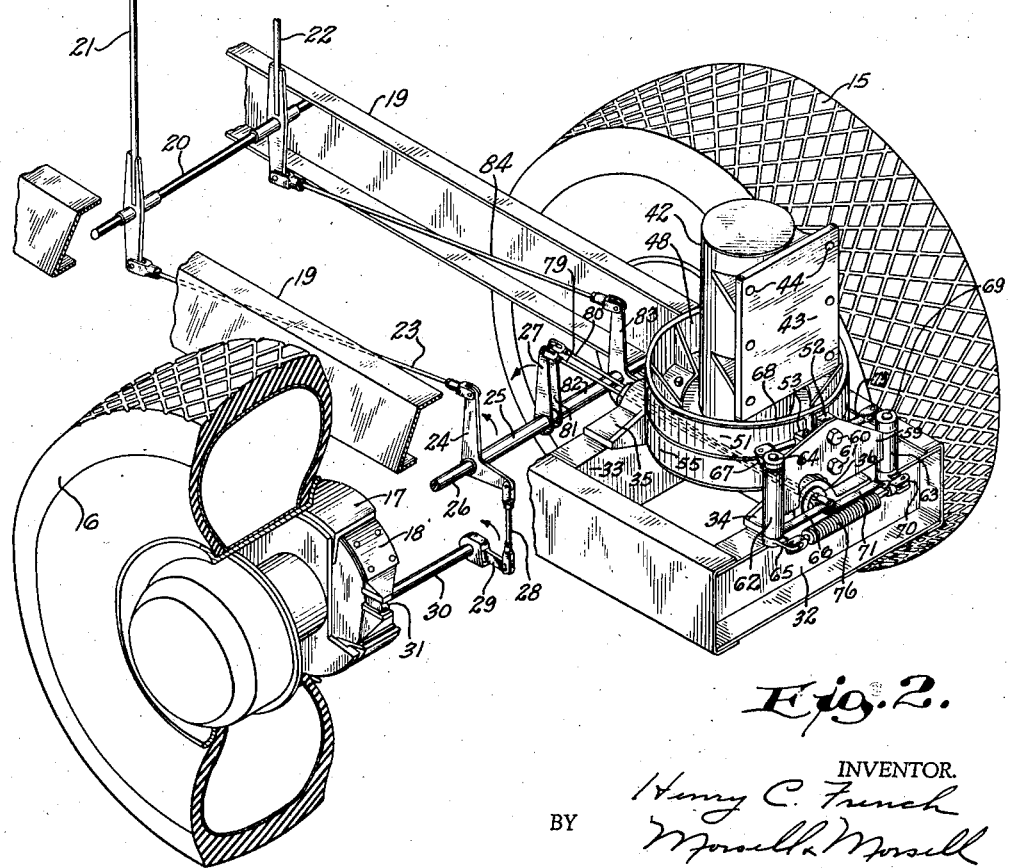
Fig. 2 is a fragmentary perspective view of the rear end of the tractor with parts broken away to illustrate the improved steering mechanism and fifth wheel.

Referring more particularly to Fig. 2, the tractor frame 19 carries a transverse rod 20 on which steering control levers 21 and 22 are pivotally mounted. The lever 21 is connected by a link 23 with a bell crank lever 24. The bell crank lever 24 is rigidly connected to one end of a sleeve 25, and the sleeve 25 is rotatable around a transverse rod 26. An arm 27 is rigidly connected to the opposite end of the sleeve 25 so that when the hand lever 21 is pulled toward the rear of the tractor the bell crank lever 24 and arm 27 are simultaneously swung in the direction indicated by the arrows in Fig. 2.

The rearwardly projecting arm of the bell crank 24 has one end of an adjustable link 28 pivotally connected thereto and the other end of the link 28 is pivotally connected to an arm 29 which operates to rotate a rod 30 carrying a brake operating cam 31. Partial rotation of the rod 30 will cause the cam 31 to expand the brake band 18 into braking position. This operation of the brake band 18 is actuated independently of any braking action which may be effected through the brake pedal of the tractor to stop the vehicle.

At the rear of the tractor are transverse members 32 and 33 which support bearing blocks 34 and 35. Journalled within the bearing blocks 34 and 35 is a longitudinal pivot sleeve 36 (see Fig. 4). Rigidly mounted on the pivot sleeve 36 to pivot therewith is the lower end of an intermediate element 37. This intermediate element includes an upstanding king pin 38 and serves as a portion of the fifth wheel. Rotatable around the king pin 38 on bearings 39, 40, and 41, is a vertical pivot column 42. This pivot column carries a rigid rearwardly facing plate 43 (see Fig. 2), formed with bolt holes 44. Thus the forwardly projecting neck 45 of a trailer vehicle may be rigidly connected to the vertical pivot column 42 by means of bolts 46, as illustrated in Figs. 1 and 4.

Surrounding the lower portion of the vertical pivot column and rigidly connected thereto by bolts 47 is a ring 48 formed on its external periphery with an upper brake drum 49 and with a lower brake drum 50. Cooperable with the upper drum 49 is a brake band 51 having an exteriorly projecting anchoring lug 52 at one end and a pivot lug 53 at its opposite end (see Figs. 3 and 5). The anchoring lug is bored as at 54. Cooperable with the lower brake drum 50 is a lower brake band 55 having an exteriorly projecting anchoring lug 56 at one end and a pivot lug 57 at its opposite end. The lug 56 is bored as at 56'. It is important to note that the position of the anchoring lug and pivot lug on the lower brake band are reversed from the position of the corresponding anchoring lug 52 and pivot lug 53 of the upper brake band.

Projecting rearwardly from the intermediate element 37 of the fifth wheel is a horizontal plate 58 carrying an upstanding vertical plate 59 at its rear edge. Bolts 60 and 61 which are threaded through the upstanding plate 59 have their inner ends extending loosely into the bores 54 and 56' of the brake band anchoring lugs 52 and 56. Thus the ends of these brake bands are supported from the upstanding plate 59 but the loose fit of the bolts in the bolt holes 54 and 56' permits a certain amount of angular movement of the anchoring lugs on the bolts.

One edge of the upstanding plate 59 carries a rigid sleeve 62, and the other edge carries a shorter sleeve 63. A pin 64 rotatable in the sleeve 62 has a bell crank rigidly connected to its lower end, having a rearwardly projecting arm 65 and a transversely projecting arm 66. The upper end of the pin 64 has rigidly connected thereto an arm 67, and this arm is pivotally connected to one end of a link 68. The other end of the link 68 is pivotally connected to the pivot lug 53 of the upper brake band 51 (see Fig. 3). A pin 69 rotatable in the shorter sleeve 63 rigidly carries on its lower end a bell crank having a rearwardly projecting arm 70 and having a transverse arm 71 which extends toward and terminates directly below the end of the arm 66 from the opposite side. The upper end of the pin 69 carries rigidly an arm 72 which is pivotally connected to one end of a link 73, and the other end of the link 73 is pivotally connected to the pivot lug 57 of the lower brake band 55.

Referring again to Fig. 3, a rod 74, which is pivotally connected to the rearwardly projecting end of the arm 70, is slidable in a sleeve 75 which is pivotally connected to the rearwardly projecting arm 65 on the opposite side. A coil spring 76 surrounding the rod 74 and sleeve 75 and coacting at its ends with collars 77 and 78 normally urges both brake bands into a light braking position around their respective drums.

Referring to Figs. 2 and 4, the arm 27 is connected by an operating cable 79 extending through the longitudinal pivot sleeve 36 with the end of the bell crank arm 71. The bell crank arm 66 projecting from the opposite side of the rear plate 59 has its end connected by a cable 80 extending through the longitudinal pivot sleeve 36 with the upper end of an arm 81 which is rigidly connected to one end of a sleeve 82. The sleeve 82 is rotatable on the transverse rod 26. The opposite end of the sleeve 82 has a bell crank 83 rigidly connected thereto, and the upstanding arm of this bell crank is connected by a link 84 with the manual control lever 22, as shown in Fig. 2. The other arm of the bell crank 83 is connected by a link 85 with an arm 86 mounted rigidly on a rotatable rod 87. The rod 87 carries on its outer end a brake band operating cam 88 for operating the brake band 18 associated with the tractor wheel 15.

Operation

During operation, with a trailer vehicle connected to the tractor, as shown in Fig. 1, if the operator desires to proceed forwardly in a straight line relative turning movement around the fifth wheel is automatically prevented. For example, referring to Fig. 2, if there were any tendency for the wheel 15 of the tractor to travel around the wheel 16, this would tend to cause rotation of the brake drum member 48 in a clockwise direction within the brake bands. However, such relative rotation would be in a wrapping direction with respect to the lower brake band so that the lower brake band which is normally urged by the spring 76 into braking position would be more tightly wrapped around its drum to prevent any relative swinging movement. On the other hand, if there were a tendency for the tractor wheel 16 to swing around the tractor wheel 15, this would cause a relative movement of the brake drum in a counter-clockwise direction within the brake bands, which would cause an immediate wrapping of the upper brake band around its drum. This is true because of the fact that the upper brake band is wrapped in a reverse direction around its drum from the lower brake band, due to the reverse position of the brake band anchoring lugs 52 and 56 on opposite ends of their respective bands as illustrated in Fig. 5. Thus the unique braking arrangement at the fifth wheel prevents undesired swinging movement around the fifth wheel when the operator desires to travel in a straight line.

If, however, the operator desires to turn to the left, referring to Fig. 2, he pulls the hand lever 21 toward the rear of the tractor. This causes movement of the arm 27 in the direction of the arrow in Fig. 2, a forward pull on the cable 79, movement of the bell crank arm 71, partial rotation of the pin 69 in the short sleeve 63, and releasing movement of the lower brake band 55. During such a turn toward the left there is a relative clockwise movement of the brake drum within the upper brake band, which is in an unwrapping direction with respect to said brake band. Thus relative movement in a clockwise direction of the brake drum and vertical pivot column 42 is permitted. Immediately after the fifth wheel braking mechanism is thus released, the bell crank 24 and associated parts function to set the brake band 18 on the wheel 16. Thus the tractor will turn toward the left. By pulling the steering control lever 21 a shorter distance than the full amount the parts will be actuated less completely and a less abrupt turn may be made. Thus a very sensitive steering control is provided.

To turn the tractor toward the right, referring to Fig. 2, the hand lever 22 is pulled toward the rear of the tractor and this causes a pull on the cable 80 and loosening of the upper brake band 51 immediately followed by a setting or partial setting of the brake connected with the tractor wheel 15. During such a right turn there is a relative counterclockwise movement of the brake drum which is in an unwrapping direction with respect to the lower brake band. Thus the pair of reversely wrapped brake bands around the fifth wheel function not only to prevent undesired turning movement when the vehicles should be traveling in a straight line but also function to permit turning movement in a selected direction when this is desired.

When a turn is being effected the differential 14 in the tractor axle permits the driving movement of one wheel around the other.

Although only one form of the invention has been shown and described, it is obvious various changes and modifications may be made without departing from the spirit of the invention, and all of such changes are contemplated as may come within the scope of the claims.

What is claimed is:

1. In combination, a pulling vehicle, a trailer vehicle, a fifth wheel for coupling said pulling vehicle and trailer vehicle, braking means embodied in said fifth wheel for normally preventing relative swinging movement between the two vehicles in either direction, means for causing steering movement of the pulling vehicle, and releasable mechanism included in said fifth wheel braking means to permit relative swinging movement between the two vehicles in a single selected direction while said braking means remains effective in the reverse direction.

2. In combination, a pulling vehicle, a trailer vehicle, a fifth wheel for coupling said pulling vehicle and trailer vehicle, braking means including two brake bands wrapped in reverse directions from each other embodied in said fifth wheel for normally preventing swinging movement between the two vehicles, means for causing steering movement of the pulling vehicle in a selected direction, and means for releasing the brake band of the fifth wheel, which is wrapped in a direction to normally restrain steering movement in the selected direction.

3. In combination, a pulling vehicle, a trailer vehicle, a fifth wheel for coupling said pulling vehicle and trailer vehicle, braking means embodied in said fifth wheel for normally preventing relative swinging movement between the two vehicles in either direction, means for causing steering movement of the pulling vehicle, releasable mechanism included in said fifth wheel braking means to permit relative swinging movement between the two vehicles in a single selected direction while said braking means remains effective in the reverse direction, and a common control for said steering means and said fifth wheel brake releasing means.

4. In combination, a two-wheeled pulling vehicle having a driven axle provided with a differential and having a brake for each wheel, a trailer vehicle, a fifth wheel for coupling said pulling vehicle and trailer vehicle, braking means embodied in said fifth wheel for normally preventing relative swinging movement between the two vehicles, means for selectively applying the brake to one or the other of said pulling vehicle wheels to cause steering movement of the pulling vehicle in a selected direction, and means for releasing said fifth wheel braking means to permit said steering movement.

5. In combination, a two-wheeled pulling vehicle having a driven axle provided with a differential and having a brake for each wheel, a trailer vehicle, a fifth wheel for coupling said pulling vehicle and trailer vehicle, braking means including two brake bands wrapped in reverse directions from each other embodied in said fifth wheel for normally preventing relative swinging movement between the two vehicles, means for selectively applying the brake to one or the other of said pulling vehicle wheels to cause steering movement of the pulling vehicle in a selected direction, and means operable on a selected one of the brake bands of the fifth wheel for releasing said fifth wheel braking means to permit said steering movement in said selected direction.

6. In combination, a two-wheeled pulling vehicle having a driven axle provided with a differential and having a brake for each wheel, a trailer vehicle, a fifth wheel for coupling said pulling vehicle and trailer vehicle, braking means including two brake bands wrapped in reverse directions from each other embodied in said fifth wheel for normally preventing relative swinging movement between the two vehicles, means operable by a single control for releasing one of the brake bands of the fifth wheel braking means and for applying the brake to one of the pulling vehicle wheels to cause steering of the pulling vehicle in one direction, and means operable by another control for releasing the other brake band of the fifth wheel braking means and for applying the brake to the other wheel of the pulling vehicle to cause steering of the pulling vehicle in the opposite direction.

7. In a pulling vehicle, a longitudinally extending pivot member pivoted to the pulling vehicle for rocking movement on a horizontal axis, a first fifth wheel pivot member rigidly connected to said longitudinal pivot member, a cooperating fifth wheel pivot member rotatable with respect to said first fifth wheel member and connectable to a trailer vehicle, a brake drum connected to one of said cooperating fifth wheel pivot members, a brake band connected to the other fifth wheel member and cooperable with said brake drum, means for normally urging said brake band toward braking position, and means for releasing said brake band from a remote position.

8. In a pulling vehicle, a first fifth wheel pivot member on the pulling vehicle, a cooperating fifth wheel pivot member rotatable with respect to said first fifth wheel member and connectable to a trailer vehicle, two brake drums connected to said cooperating fifth wheel pivot member, two brake bands each having a movable end and wrapped in reverse directions from each other on said drums, and connected to said pulling vehicle, means for normally urging both of said brake bands toward braking position, and means for releasing a selected one of said brake bands to permit relative rotation of the fifth wheel pivot members with respect to each other in a selected direction.

9. In a pulling vehicle, a longitudinally extending pivot sleeve pivoted to the pulling vehicle for rocking movement on a horizontal axis, a first fifth wheel pivot member rigidly connected to said sleeve, a cooperating fifth wheel pivot member rotatable with respect to said first fifth wheel pivot member and connectable to a trailer vehicle, a brake drum connected to said cooperating fifth wheel pivot member, a brake band connected to said pivot sleeve and cooperable with said brake drum, means for normally urging said brake band toward braking position, and means including an operating cable extending through said pivot sleeve for releasing said brake band.

10. In a pulling vehicle, a longitudinally extending pivot sleeve pivoted to the pulling vehicle for rocking movement on a horizontal axis, a first fifth wheel pivot member rigidly connected to said sleeve, a cooperating fifth wheel pivot member rotatable with respect to said first fifth wheel pivot member and connectable to a trailer vehicle, two brake drums connected to said cooperating fifth wheel pivot members, two brake bands each having a movable end and wrapped in reverse directions from each other on said drums, and connected to said pivot sleeve, means for normally urging both of said brake bands toward braking position, and means including an operating cable for each brake band extending through said pivot sleeve for effecting release of said brake bands.

11. In a pulling vehicle, a longitudinally extending pivot sleeve pivoted to the pulling vehicle for rocking movement on a horizontal axis, a first fifth wheel pivot member rigidly connected to said sleeve, a cooperating fifth wheel pivot member rotatable with respect to said first fifth wheel pivot member and connectable to a trailer vehicle, two brake drums connected to said cooperating fifth wheel pivot member, two brake bands each having a movable end and wrapped in reverse directions from each other on said drums, a supporting plate connected to said longitudinal pivot sleeve and positioned adjacent the rear of the brake drums and supporting the brake bands, actuating means for each brake band carried by said supporting plate and connected to the movable ends of the brake bands, spring means connected to said actuating means for simultaneously urging both brake bands toward drum engaging position, each actuating means also having an arm with an operating end positioned adjacent the rear end of the longitudinally extending pivot sleeve, and means including operating cables, one connected to each of said arms, extending through the pivot sleeve for imparting motion to said brake band actuating means.

HENRY C. FRENCH.